United States Patent [19]

Kalis

[11] Patent Number: 5,388,434
[45] Date of Patent: Feb. 14, 1995

[54] ANTI-THEFT MOUNTING KNOB

[75] Inventor: Robert M. Kalis, Prairie Village, Kans.

[73] Assignee: Relm Communications, Inc., Melbourne, Fla.

[21] Appl. No.: 99,967

[22] Filed: Jul. 29, 1993

[51] Int. Cl.$^6$ .................... E05B 73/00; F16B 41/00
[52] U.S. Cl. ............................... 70/58; 70/165; 70/223; 70/231; 70/232; 248/553
[58] Field of Search .............. 70/218, 222, 223, 472, 70/165, 188, 189, DIG. 57, 58, 422, 229–232; 411/402, 408, 910; 248/553

[56] References Cited

U.S. PATENT DOCUMENTS

| | | | |
|---|---|---|---|
| 742,562 | 10/1903 | Becraft | 70/232 |
| 1,560,503 | 11/1925 | Doenges | 70/231 |
| 1,604,690 | 10/1926 | Halaby | 70/232 |
| 1,726,516 | 8/1929 | Parker | 70/230 |
| 1,768,293 | 6/1930 | Reed | 70/231 |
| 3,785,183 | 1/1974 | Sander | 70/58 |
| 3,796,074 | 3/1974 | Vik | 70/231 |
| 4,336,698 | 6/1982 | Hurd | 70/231 |
| 4,441,344 | 4/1984 | Kurpershoek | 70/231 |
| 4,747,528 | 5/1988 | Kamaya | 70/231 X |
| 4,875,819 | 10/1989 | Wilkinson | 70/231 X |

FOREIGN PATENT DOCUMENTS

| | | | |
|---|---|---|---|
| 529555 | 12/1921 | France | 70/232 |
| 288323 | 10/1928 | United Kingdom | 70/231 |
| 360304 | 11/1931 | United Kingdom | 70/231 |

Primary Examiner—Lloyd A. Gall
Attorney, Agent, or Firm—Allegretti & Witcoff, Ltd.

[57] ABSTRACT

A theft prevention device for use in the mounting of automotive audio equipment, such as a two-way radio to a secure structure, such as a "U" bracket or trunnion. The invention is a generally conical-shaped mounting knob that threadably attaches the audio equipment to the mounting bracket. Attached to one end of the knob enclosure is a key lock and attached to the opposite end is a threaded stud that is able to rotate about the longitudinal axis of the enclosure. In operation, the knob, in its unlocked position, is rotated clockwise until the threaded stud is securely attached to its threaded counterpart on the radio. In this position, the lock assembly rotates a cam plate so that an engaging disc engages both the knob enclosure and a stud plate allowing torque applied to the enclosure to be transferred to the threaded stud. The knob is then locked. In this position, the lock assembly rotates the cam plate so that the engaging disc does not engage the stud plate, and a compression spring forcibly separates the engaging disc and stud plate. Torque is not transferred from the enclosure to the stud plate. The knob will rotate freely in either the clockwise or counterclockwise direction, but the stud will not loosen or tighten, thus preventing removal of the radio from the vehicle.

10 Claims, 3 Drawing Sheets

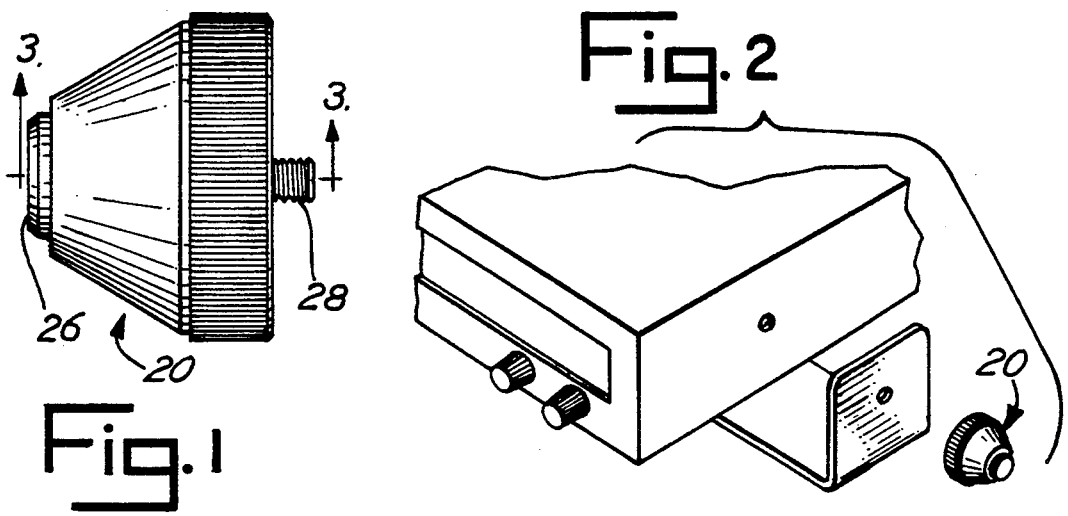
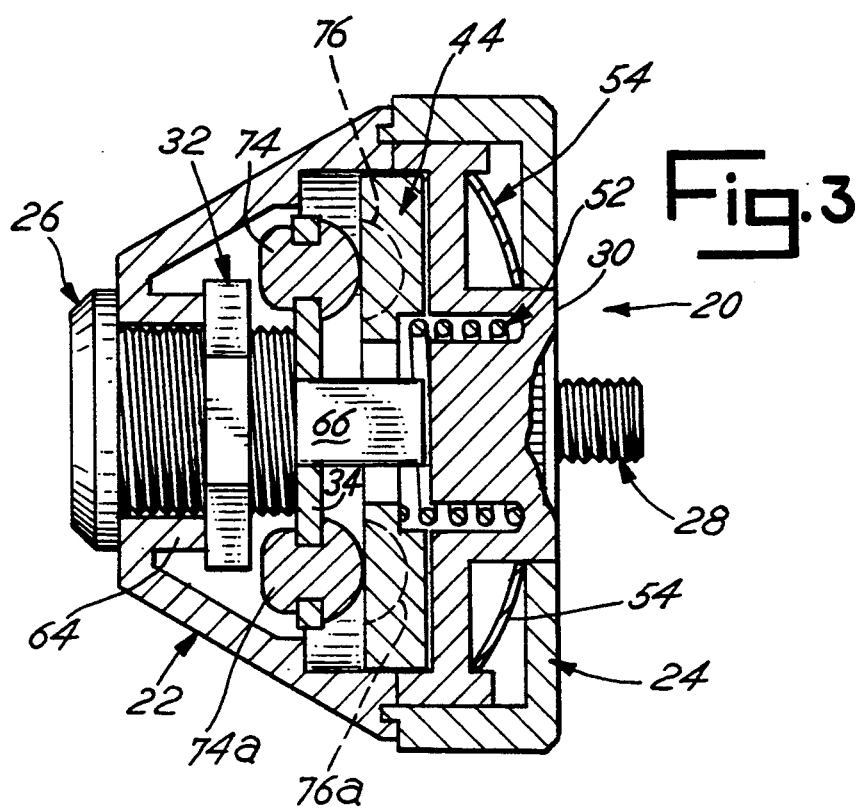

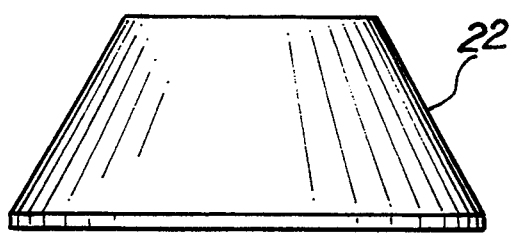
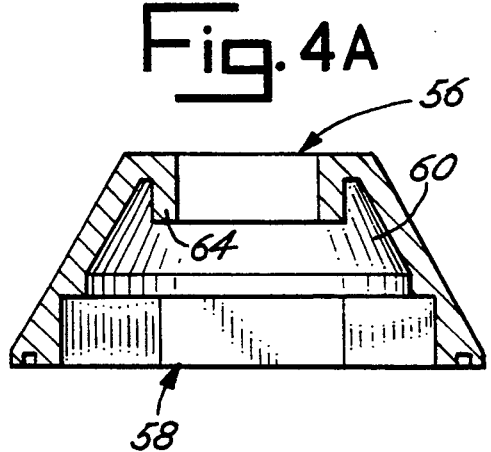
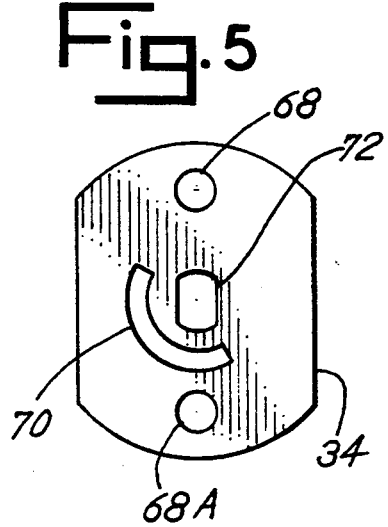
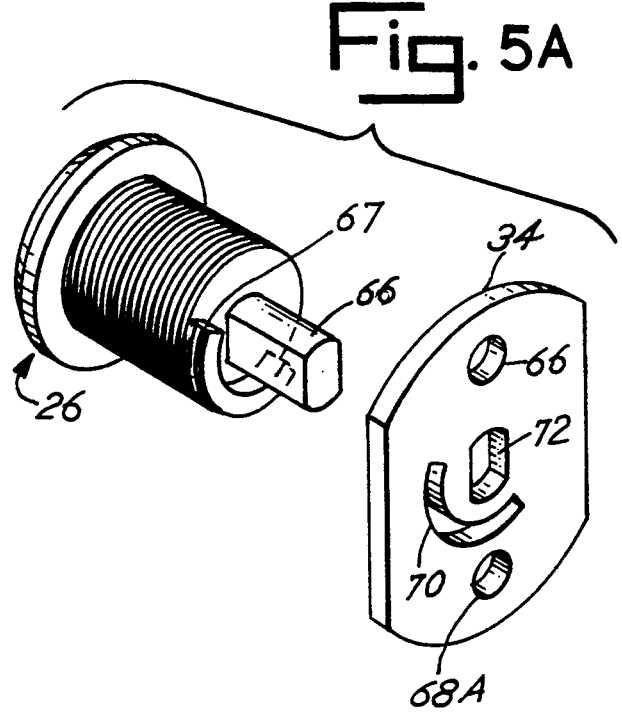

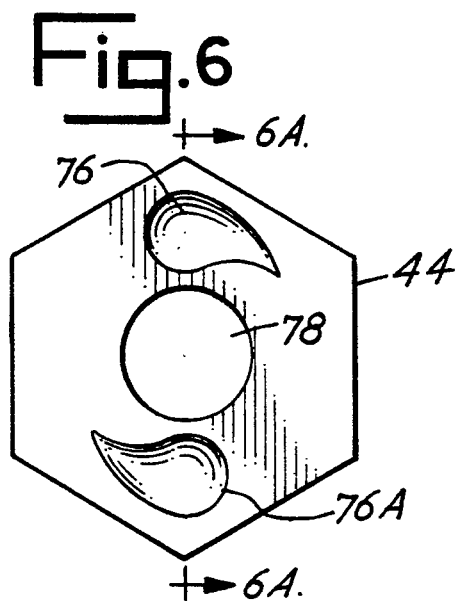
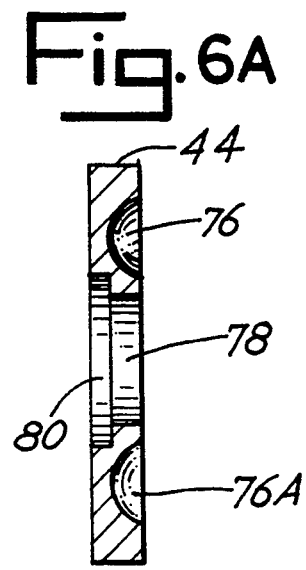
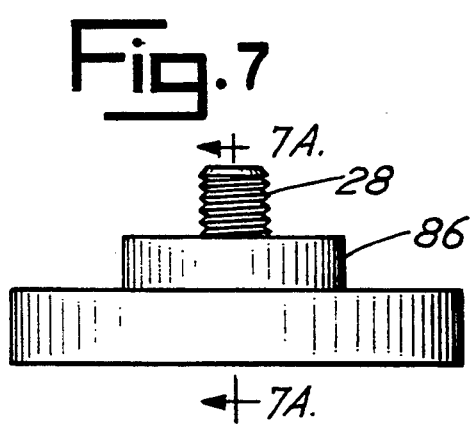
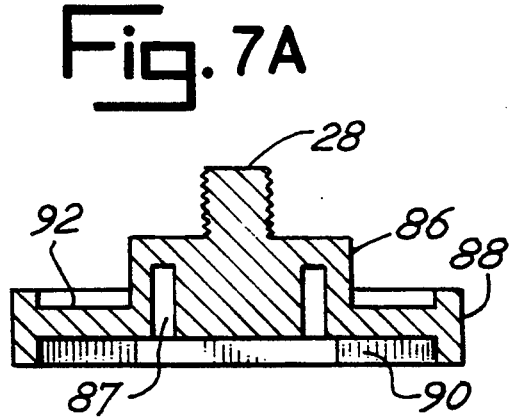
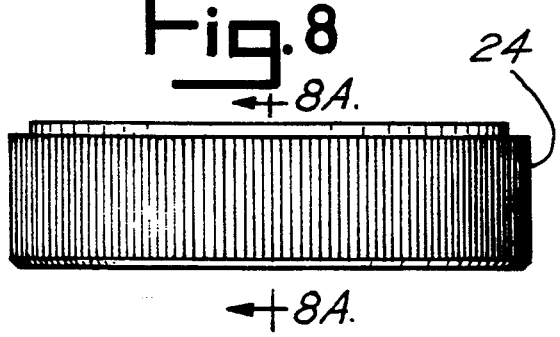
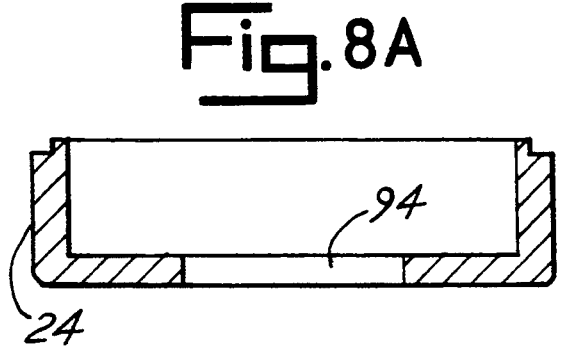

1

ANTI-THEFT MOUNTING KNOB

BACKGROUND OF THE INVENTION a. Field of the Invention

This invention relates to theft prevention devices for automotive radios and accessories, and more particularly, to a theft deterrent locking knob for mounting radios and accessories.

b. Description of Related Art

Theft of radios and other audio accessories from automobiles is, unfortunately, a common occurrence. Accordingly, numerous types of security devices exist to discourage or prevent such theft. Types of security devices include guards that cover or encase the equipment or devices that disguise the underlying expensive equipment. For example, U.S. Pat. Nos. 4,553,414 to Caputo, 4,248,069 to Burbank and 3,699,787 to Corrado involve the use of lockable covers that can be secured over the face of the audio equipment. U.S. Pat. No. 4,365,280 to Crosetti discloses a false front that simply slides into place over the equipment. U.S. Pat. No. 4,211,995 to Smith discloses encasing the equipment in a special container and wiring the container to an electric alarm system.

U.S. Pat. No. 4,962,651 to Gibbs discloses a theft prevention device for use on the mounting bolts of automotive audio equipment. The device includes a pair of uniquely designed nuts that can not be effectively gripped with a wrench or other conventional turning tool in order to remove the audio equipment from the automobile.

The present invention offers a simple and inexpensive way to mount automotive equipment in such a way to deter thefts of such equipment. In accordance with the present invention, the audio equipment can be initially secured in place on the dashboard or floorboard and thereafter securely held in place without the need for the owner to constantly lock and unlock the device or manipulate any parts each time the owner exits the vehicle. The invention also offers a locking device that is easily removable and is capable of being used on other pieces of equipment.

SUMMARY OF THE INVENTION

According to the present invention, the foregoing and other objects are attained by a theft prevention device for use in mounting automotive audio equipment, such as a two-way radio, to a secured structure, such as a mounting bracket or trunnion, attached to the floorboard or dashboard. The invention is a generally conical-shaped mounting knob that threadably attaches the audio equipment to the mounting bracket. Attached to one end of the knob enclosure is a key lock and attached to the opposite end is a fastening means, such as a threaded stud, that is able to rotate about the longitudinal axis of the enclosure. A cam-function engaging means attaches to the lock assembly. Torque applied to the enclosure is transmitted by the engaging means to the fastening means when the lock is in the unlocked position. When the lock is in the locked position, torque applied to the enclosure is not transmitted by the engaging means to the fastening means. Therefore, in the locked position the knob will simply rotate about the fastening means and prevent the removal of the audio equipment from the secured structure.

In operation, the knob, in its unlocked position, is rotated clockwise until the threaded stud is securely attached to its threaded counterpart on the radio. In this position, the lock assembly rotates a cam plate so that an engaging disc engages both the knob enclosure and a stud plate allowing torque applied to the enclosure to be transferred to the threaded stud. The knob is then locked. In this position, the lock assembly rotates the cam plate so that the engaging disc does not engage the stud plate, and a compression spring forcibly separates the engaging disc and the stud plate. Torque is not transferred from the enclosure to the stud plate. The knob will then rotate freely in either the clockwise or counterclockwise direction, but the stud will not loosen or tighten, thus preventing removal of the radio from the vehicle. To remove the knob, the knob must be unlocked using a special key. In this position, any loosening or tightening torque applied to the enclosure will be transmitted to the stud.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The following detailed description, which describes only the preferred embodiment of the invention, is understood only to be an illustration of the best mode contemplated of carrying out the invention. As will be realized, the invention is capable of other and different embodiments and applications, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 1 is a side view of the invention;

FIG. 2 is a perspective view of an intended use of the invention;

FIG. 3 is an exploded cut-away elevation view showing the arrangement of the elements of the invention;

FIG. 4 is a view of the enclosure;

FIG. 4A is a cut-away elevation view of the enclosure;

FIG. 5 is a view of the cam plate;

FIG. 5A is a perspective view of the relationship between the lock assembly and the cam plate;

FIG. 6 is a view of the engaging disc;

FIG. 6A is a cut-away elevation view of the engaging disc;

FIG. 7 is a view of the stud plate;

FIG. 7A is a cut-away elevation view of the stud plate;

FIG. 8 is a view of the base; and

FIG. 8A is a cut-away elevation view of the base.

DETAILED DESCRIPTION OF THE INVENTION

The theft prevention device of the present invention is primarily intended for mounting or attaching radio and accessory equipment within vehicles. The invention has a more specific use for mounting audio equipment, such as a two-way radio, on a dashboard using a conventional "U"-shaped mounting bracket or trunnion. The invention, however, has broad applications whether in an automobile, at home, or wherever there is a need to discourage theft of property. The following description makes reference to mounting a mobile radio to a dashboard or a floorboard only as a means to illustrate the use of the invention, but in no means is intended to limit the applications of the invention.

The invention provides an anti-theft fastening device for mounting or attaching a mobile radio to a dashboard or floorboard that prevents the fastening means from being unfastened by unauthorized personnel. Referring to FIG. 1, the invention is a substantially conical-shaped mounting knob 20 having a lock assembly 26 mounted to a first end and a threaded stud 28 attached to a second end. Generally, the threaded stud 28 passes through a mounting bracket (fixed to the vehicle) and engages a threaded counterpart on the radio as shown in FIG. 2. The knob 20, in its unlocked position, is rotated clockwise until tight, then locked. In the locked position, the knob will rotate freely in either direction, but will not loosen, thus preventing removal of the radio from the vehicle. To remove the knob, the knob must be unlocked using a special key and rotated in a counterclockwise direction. The invention can be manufactured of any suitable material strong enough to withstand attempts to forcibly remove it.

FIG. 3 illustrates the internal construction of the invention. Specifically, mounting knob 20 comprises a generally conical-shaped enclosure 22, shown in more detail in FIG. 4, having a first open end 56 and a hex-shaped second open end 58. Enclosure 22 further defines cavity 60 in which other elements of the invention are located.

Lock assembly 26 inserts into cavity 60 through opening 56 and securely fastens to enclosure 22 by means of nut 32 tightened against annular flange 64. Lock assembly 26 may be any miniature cam lock, such as miniature cam lock number C520 S, manufactured by Illinois Lock Co. of Wheeling Ill. As shown in FIG. 5A, lock 26 comprises a rotatable member 66 and an arcuate-shaped fixed member 67. Rotatable member 66 undergoes a rotational motion in response to the key position of lock 26 changing from the locked to unlocked position and vice versa.

Referring to FIGS. 3 and 5, cam plate 34 comprises cam openings 68 and 68A, an arcuate-shaped slotted opening 70 and a center opening 72. Referring again to FIG. 5A, slotted opening 70 interfaces with fixed member 67 and acts as a stop to limit the rotational motion of cam plate 34, as is discussed below. Center opening 72 is sized to slidably attach to rotatable member 66. Accordingly, cam plate rotates in response to the key position of lock 26. Cam openings 68 and 68A accept cams 74 and 74A, respectively. Preferably, cams 74 and 74A are solid ⅛" steel round head rivets. Cams 74 and 74A are inserted so that the round head interfaces the engagement disc 44. Alternatively, other types of cam configurations, such as rails having varying depths, may be used for the cam function and modified accordingly for this application as would be known to those skilled in the art.

Referring to FIGS. 6 and 6A, engagement disc 44 is a hex-shaped plate comprising two cam slots 76 and 76A, a center opening 78 and an annular depression 80. Cam slots 76 and 76A are configured so that at one end the slots are deep enough to accept cams 74 and 74A. The remaining portion of the cam slots are configured so that the depth decreases uniformly. The sweep of cams 74 and 74A within slots 76 and 76A is dependent upon the rotational motion of cam plate 34 as determined by the length of slotted opening 70, the range of motion of rotational element 66 from its unlocked to locked position and the size of fixed member 67 in relation to slotted opening 70. That is, in the locked position, cams 74 and 74A are positioned within the bulbous portion of slots 76 and 76A. Moving from the locked position to the unlocked position, cams 74 and 74A rotate through cam slots 76 and 76A and come to rest at the opposite end of slots 76 and 76A or on the engagement disc surface. The rotation of cam plate 34 from the locked to the unlocked position causes disc 44 to move axially within the second open end 58. The total travel in this axial direction is 0.10 inches. Disc 44 is, however, prevented from rotating about the longitudinal axis of enclosure 22 since the second open end 58 is hex-shaped or "keyed" to correspond in shape with the hex shape of disc 44.

Referring to FIGS. 7 and 7A, stud plate 30 is a three-tiered member that aligns with and seals the second open end 58. Stud plate 30, however, does not fixedly attach to enclosure 22. Extending outwardly from stud plate 30 is the threaded stud 28 that threadably engages a threaded interface on a radio. The second tier 86 comprises an annular slot 87 in which an annular compression spring 52 rests. Compression spring 52 also engages annular depression 80. Compression spring 52 forcibly separates disc 44 from stud plate 30 when lock 26 is in the locked position, as is discussed below. Alternate means may be used to separate these two elements, such as magnetic forces. The third tier 88 comprises a hex recess 90 sized to accept disc 44 and an annular groove 92 that accepts a pair of spring washers 54.

Referring to FIGS. 3, 8 and 8A, stud plate 30 and the other internal elements of the invention discussed above are secured in a cooperating relationship within cavity 60 by base 24. The circumferences of enclosure 22 and base 24 comprise interlocking surfaces and are fixedly attached by any conventional means such as an adhesive or ultrasonic weld. The attachment means must be made permanent to prevent tampering or opening of the assembly. Base 24 comprises a central opening 94 through which threaded stud 28 passes. Stud plate 30 does not fixedly engage base 24, but rather is able to freely rotate about the inner circumference of base 24. Preferably, the outer circumference of base 24 is textured in such a way that allows an individual to grasp the base 24 when rotating knob 20.

In operation, knob 20 has two functional positions, unlocked and locked. In the unlocked position, shown in FIG. 3, the lock assembly 26 is key-operated to position cams 74 and 74A on top of engagement disc 44. In this position, disc 44 is fixedly engaged with both enclosure 22 and stud plate 30. Rotating knob 20 will allow tightening or loosening of threaded stud 28. The torque from the outer shell 22/24 is transferred to stud plate 30 through hex disc 44. Disc 44 is securely held in this downward position by cams 74 and 74A. When the key is turned to rotate lock 26 to the locked position, cams 74 and 74A rotate to engage the bulbous areas of slots 76 and 76A respectively. Disc 44 is forcibly disengaged from stud plate 30 by compression spring 52. Disc 44 now engages only enclosure 22. Therefore, if knob 20 is rotated to remove it, it will only rotate because torque is not transmitted to stud plate 30. Therefore, threaded stud 28 will not loosen or tighten.

To remove the knob, the lock is moved to the unlocked position, cam plate 34 rotates and forces disc 44 to engage stud plate 30 and compresses spring 52. While in the locked position, enclosure 22 and disc 44 may have been rotated independently of plate 30, therefore, disc 44 and hex recess 90 may not line up exactly. If not lined up, spring washer 54 compresses because plate 30 and disc 44 move together away from cam plate 34. As knob 20 is rotated, it will rotate only as far as needed to align disc 44 with plate 30, then both will snap into engagement. Torque will now transfer to plate 30 and knob 20 may be loosen or tightened.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A theft prevention device for threadably attaching property to a secure structure comprising:
   a. an enclosure having a first open end and a second open end and further defining a cavity;
   b. a lock assembly extending into said cavity through said first open end, said lock assembly having a locked position and an unlocked position;
   c. fastening means for threadably attaching said device to a threaded counterpart, said fastening means rotatably attachable to said second end;
   d. an engaging means having a portion rotatably connected to said lock assembly for transmitting torque applied to said enclosure to said fastening means, said engaging means having a portion being in a slidable, interlocking relationship with said enclosure and an engaging relationship with said fastening means when said lock assembly is in said unlocked position and a disengaged relationship with said fastening means when said lock assembly is in said locked position;
   whereby when in said unlocked position, torque applied to said enclosure is transmitted through said engaging means to said fastening means to threadably engage or disengage said threaded counterpart, and when in said locked position, torque applied to said enclosure is not transmitted through said engaging means to said fastening means and said enclosure rotates freely about said fastening means;
   wherein said engaging means comprises a cam plate rotatably attached to said lock assembly and comprising one or more cams; and an engaging disc comprising one or more cam slots for engaging said one or more cams.

2. The theft prevention device of claim 1 wherein said fastening means is a stud plate comprising a threaded stud.

3. The theft prevention device of claim 1 wherein said cam or cams are ⅜' solid steel round head rivets.

4. The theft prevention device of claim 1 wherein said engaging means further comprises a stopping means for limiting the rotational travel of said cam plate.

5. The theft prevention device of claim 1 further comprising separating means for disengaging said engaging means from said fastening means when in said locked position.

6. The theft prevention device of claim 5 wherein said separating means is a compression spring.

7. A theft prevention device for threadably attaching property to a secure structure comprising:
   a. an enclosure having a first open end and a second open end and further defining a cavity;
   b. a lock assembly extending into said cavity through said first open end, said lock assembly having a locked position and an unlocked position;
   c. a stud plate comprising a threaded stud for threadably attaching said device to a threaded counterpart, said stud plate rotatably attaches to said second end so that said threaded stud extends outwardly from said enclosure;
   d. a cam plate rotatably attached to said lock assembly comprising a first cam and a second cam;
   e. an engaging disc in a slidable, interlocking relationship with said second open end and comprising a first cam slot and a second cam slot in a cooperating relationship with said respective cams;
   wherein said cam plate engages said enaging disc with said stud plate when in said unlocked position and said cam plate disengages said engaging disc from said stud plate when in said locked position;
   whereby when said lock assembly is in said unlocked position, torque applied to said enclosure is transmitted through said engaging disc to said stud plate to threadably engage or disengage said threaded counterpart, and when said lock assembly is in said locked position, torque applied to said enclosure is not transmitted through said engaging disc to said stud plate and said enclosure rotates freely about said stud plate.

8. The theft prevention device of claim 7 further comprising a compression spring in an annular relationship with said stud plate wherein said compression spring is in compression in said unlocked position and in tension in said locked position.

9. The theft prevention device of claim 7 wherein said lock assembly comprises a fixed arcuate-shaped member that slidably rotates through an arcuate-shaped slot contained on said cam plate so that the relationship between said fixed member and said slot provide a stopping means for limiting the rotational travel of said cam plate.

10. A theft prevention device for threadably attaching property to a secure structure comprising:
   a. an enclosure having a first open end and a second open end and further defining a cavity;
   b. a lock assembly extending into said cavity through said first open end, said lock assembly comprising a fixed arcuate-shaped member and having a locked position and an unlocked position;
   c. a stud plate comprising a threaded stud for threadably attaching said device to a threaded counterpart, said stud plate rotatably attaches to said second end so that said threaded stud extends outwardly from said enclosure;
   d. a cam plate rotatably attached to said lock assembly comprising a first cam, a second cam and an arcuate-shaped slot, said slot in a slidable relationship with said fixed member so that the relationship between said fixed member and said slot provide a stopping means for limiting the rotational travel of said cam plate;
   e. an engaging disc in a slidable, interlocking relationship with said second open end and comprising a first cam slot and a second cam slot in a cooperating relationship with said respective cams;

f. a compression spring in an annular relationship with said stud plate wherein said compression spring is in compression in said unlocked position and in tension in said locked position;

wherein said cam plate engages said enaging disc with said stud plate when in said unlocked position and said cam plate and said compression spring disengages said engaging disc from said stud plate when in said locked position;

whereby when said lock assembly is in said unlocked position, torque applied to said enclosure is transmitted through said engaging disc to said stud plate to threadably engage or disengage said threaded counterpart, and when in said locked position, torque applied to said enclosure is not transmitted through said engaging disc to said stud plate and said enclosure rotates freely about said stud plate.

* * * * *